US012730052B2

(12) United States Patent
Boersma et al.

(10) Patent No.: US 12,730,052 B2
(45) Date of Patent: Sep. 8, 2026

(54) IN-LINE IDENTIFICATION OF AEROSOL PARTICLES

(71) Applicant: Nederlandse Organisatie voor toegepast-natuurwetenschappelijk onderzoek TNO, 's-Gravenhage (NL)

(72) Inventors: Arjen Boersma, Haaren (NL); Javier Nuñez Villanueva, Eindhoven (NL); Yunqi Wang, Eindhoven (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 161 days.

(21) Appl. No.: 17/772,869

(22) PCT Filed: Nov. 4, 2020

(86) PCT No.: PCT/NL2020/050684
§ 371 (c)(1),
(2) Date: Apr. 28, 2022

(87) PCT Pub. No.: WO2021/091374
PCT Pub. Date: May 14, 2021

(65) Prior Publication Data

US 2023/0144123 A1 May 11, 2023

(30) Foreign Application Priority Data

Nov. 5, 2019 (EP) .................................... 19207220

(51) Int. Cl.

| | |
|---|---|
| ***G01N 15/06*** | (2024.01) |
| ***G01N 15/075*** | (2024.01) |
| *G01N 15/00* | (2006.01) |

(52) U.S. Cl.
CPC ..... *G01N 15/06* (2013.01); *G01N 2015/0046* (2013.01); *G01N 15/075* (2024.01)

(58) Field of Classification Search
CPC ......... G01N 2001/2223; G01N 1/2208; G01N 1/2202; G01N 1/2211; G01N 1/2247;
(Continued)

(56) References Cited

U.S. PATENT DOCUMENTS 4,127,329 A * 11/1978 Chang .................. G01N 1/2205 356/301
7,390,339 B1 * 6/2008 Warrick .................... B04C 5/13 96/417

(Continued)

FOREIGN PATENT DOCUMENTS

CN 109444326 A 3/2019
EP 3929168 A1 * 12/2021 ......... C03C 25/1061

(Continued)

OTHER PUBLICATIONS

Masoumeh, Performance evaluation of a new micro gas cyclone using simulation and experimental studies to capture indoor fine particles, Mar. 19, 2019, Advanced Powder Technology, 30, 1151-1159 (Year: 2019).*

(Continued)

*Primary Examiner* — Tarifur R Chowdhury
(74) *Attorney, Agent, or Firm* — Leydig, Voit & Mayer, Ltd.

(57) ABSTRACT

The present disclosure concerns a device for identifying a chemical composition of particulate matter comprised in an aerosol. The device comprises an impactor arranged to divert a received aerosol stream to a sensing stream having an increased particulate matter concentration. The device further comprises an optical flow cell arranged to guide a received sensing stream along an elongate hollow wave guide defining a gas flow path and an optical path following at least in part a common trajectory so as to allow light travelling along said common trajectory to interact with the particulate matter comprised in the sensing stream. A chemi- (Continued)

cal composition of the particulate matter comprised in an aerosol may be determined from a particle specific absorption peak. A particle concentration may be determined from a peak intensity.

22 Claims, 7 Drawing Sheets

(58) Field of Classification Search
CPC .......... G01N 2015/0261; G01N 15/06; G01N 15/0205; G01N 15/02; G01N 15/075
See application file for complete search history.

(56) References Cited

U.S. PATENT DOCUMENTS

| | | | | |
|---|---|---|---|---|
| 8,375,766 | B2 * | 2/2013 | Rigby | G01N 15/0656 73/1.06 |
| 8,710,849 | B2 * | 4/2014 | Tikkanen | G01N 15/0656 324/459 |
| 2003/0048314 | A1 | 3/2003 | Renn | |
| 2007/0092976 | A1 * | 4/2007 | Watson | G01N 1/2205 436/181 |
| 2009/0183737 | A1 * | 7/2009 | Oberle | A61M 16/204 128/203.25 |
| 2012/0168361 | A1 * | 7/2012 | Motakef | B01D 50/20 210/314 |
| 2012/0174650 | A1 * | 7/2012 | Ariessohn | B03C 3/41 73/23.2 |
| 2013/0081447 | A1 * | 4/2013 | Carter | G01N 21/05 73/30.01 |
| 2014/0116256 | A1 * | 5/2014 | Yamasaki | B01D 45/16 96/414 |
| 2014/0260542 | A1 * | 9/2014 | Nagano | G01N 1/2211 73/28.04 |
| 2018/0217044 | A1 | 8/2018 | Yang et al. | |

FOREIGN PATENT DOCUMENTS

| | | | | |
|---|---|---|---|---|
| KR | 20090082981 | A * | 1/2008 | |
| WO | WO-2009134495 | A2 * | 11/2009 | G01N 1/2202 |
| WO | WO 2018/118934 | A1 | 6/2018 | |
| WO | WO-2018176060 | A1 * | 9/2018 | G01N 1/2208 |
| WO | 2020043688 | A1 | 3/2020 | |

OTHER PUBLICATIONS

Lim K. S. et al., Particle Collection and Concentration for Cyclone Concentrators, Aerosol Science and Technology, 2003 (Year: 2003).*

European Patent Office, International Search Report in corresponding International Application No. PCT/NL2020/050684, dated Dec. 9, 2020 (3 pages).

Amr S. Helmy et al., "Integrated Optical Sensing Technologies on Si," Proceedings of Spie, vol. 9370, pp. 937028-1 to 937028-5, XP060044835 (2015).

Seong-Soo Kim et al., "Hollow Waveguide Gas Sensor for Mid-Infrared Trace Gas Analysis," IEEE Sensors 2007 Conference, pp. 1267-1270 (2007).

Fung-Yu Kuo et al., "Detection of Particulate Matter of Size 2.5 μm with a Surface-Acoustic-Wave Sensor Combined with a Cyclone Separator," Micromachines, vol. 9, No. 8, pp. 1-11 (2018) XP055691716.

Joao Flavio Da Silveira Petruci et al., "A Hyphenated Preconcentrator-Infrared-Hollow-Waveguide Sensor System for $N_20$ Sensing," Scientific Reports, vol. 8, No. 1, pp. 1-6, Abstract, p. 2 (2018) X055691376.

Idan Steinberg et al., "The Role of Skew Rays in Biomedical Sensing," IEEE Journal of Selected Topic in Quantum Electronics, vol. 16, No. 4, pp. 961-966 (Jul./Aug. 2010) XP011344418.

European Patent Office, Examination Report in corresponding European Patent Application No. 20807135.7 dated Jun. 25, 2024.

* cited by examiner

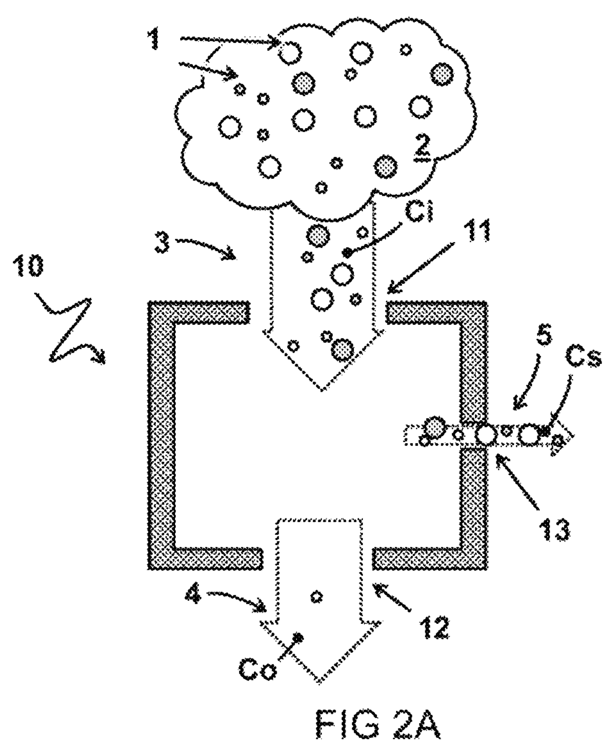
FIG 2A
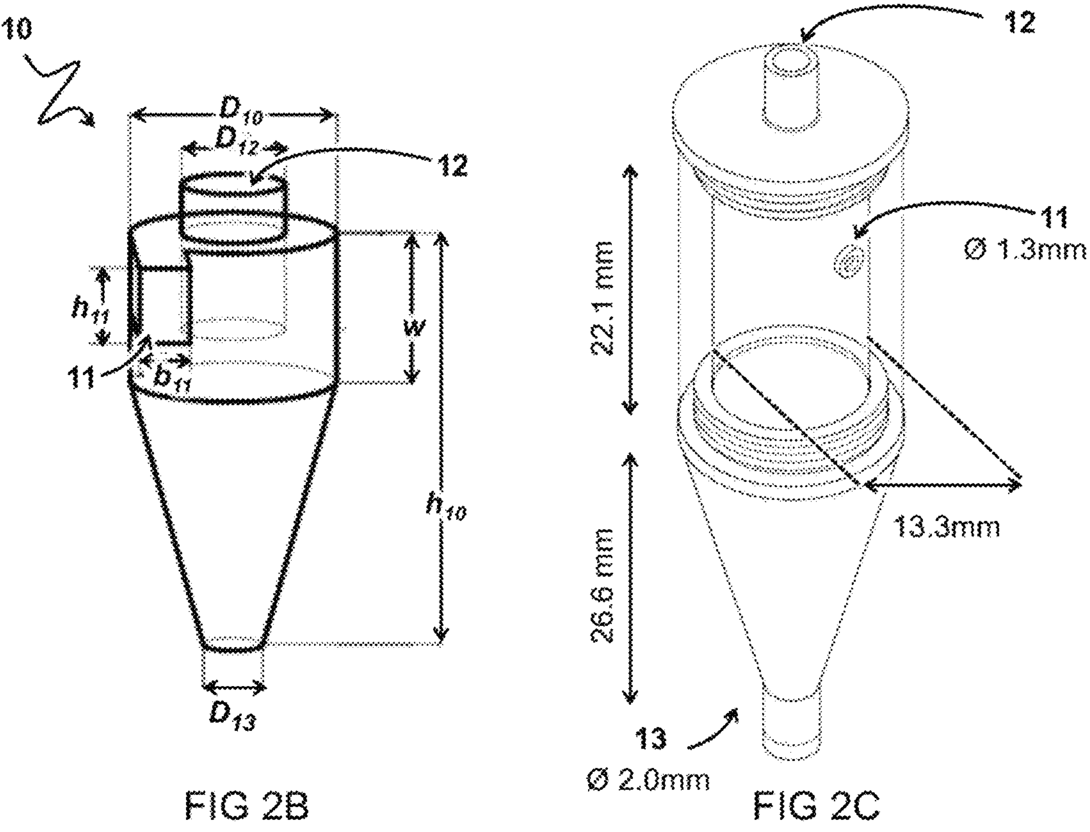
FIG 2B
FIG 2C

IN-LINE IDENTIFICATION OF AEROSOL PARTICLES

CROSS-REFERENCE TO RELATED APPLICATIONS

This patent application is a U.S. National Phase of PCT International Application No. PCT/NL2020/050684, filed Nov. 4, 2020, which claims priority to European Application No. 19207220.5, filed Nov. 5, 2019, which are both expressly incorporated by reference in their entireties, including any references contained therein.

TECHNICAL FIELD AND BACKGROUND

The present disclosure relates to devices and methods for in-line identification of chemical compositions of particulate matter in aerosols.

The term aerosol commonly refers to a suspension of fine particulate matter in air or another gas, as opposed to the particulate matter alone. The particulate matter can be natural or of man-made origin. Examples of natural particulate matter may include house dust, pollen and mold spores. Examples of man-made particulates may include soot particles e.g. in tobacco smoke or smoke from combustion engines, fly ash, and traffic-related particulates, e.g. from tire and brake wear, but also cement dust and particles generated during mechanical abrasion processes e.g. milling and drilling, for example during construction work. Particles may be organic or inorganic of nature. The chemical, e.g. elemental composition, and/or structural properties, e.g. size or shape, affect how particle interact with the environment or how a particles will behave when inhaled.

Depending on nature and size inhalation of particulate matter can cause health issues. For this reason particulate matter (PM) is typically classified in size ranges. The fraction of PM having an average diameter on the order of 10 μm or less, commonly referred to as 'coarse particulate matter' ($PM_{10}$) is known to penetrate the deepest part of the lungs. The so called 'fine particulate matter' ($PM_{2.5}$) having an average dimension of 2.5 μm or less tend to even reach the alveolus of the lung whereas. Depending of application or regulation PM may be divided into further or other size classes, e.g. PM0.1 (<100 nm) or PM have an average diameter of 4 μm or less other. Accordingly there exists a need for detecting presence or quality of particulate matter in air.

US20180217044 discloses a particulate matter sensor for detecting a quality of air. In the sensor a light beam is passed through an air flow channel. The sensor comprises a waveguide configured to direct light after it passes the air flow channel and scatters off of particulate matter within the airflow to a photodiode. Based on the output of the photodiode a volume concentration of particles in the airflow channel is determined. The sensor does not provide for identifying a particulate matter size or size distribution nor for determining a chemical composition. In a 2007 publication in IEEE Sensors Conference, pages 1267-1269 by Seon-Soo Kim, et al., there is disclosed a hollow waveguide gas sensor. In the sensor gas methane in an inert gas stream are fed in a hollow core waveguide which simultaneously serves as a light guide and miniature gas cell. Light of a FT-IR source is focused into the cell via mirrors at one end and collected at the other end by mirrors a led to a detector. No identification and characterization of particulate matter has been demonstrated. A publication by Fung-Yu Kuo et al in Micromachines August 2018, volume 9, issue 8, 398, describes detection of particulate matter of size 2.5 μm with a surface acoustic wave sensor combined with a cyclone separator. In the device an incense smoke stream is fed into a cyclone designed to filter out particles with an average diameter in excess of 2.5 μm. The output of the cyclone, having particles with an average diameter less than of 2.5 μm is fed to a surface acoustic wave (SAW) sensor where particulate matter in the flow is allowed to adsorb onto the SAW surface for a sample interval of 160 seconds causing a mass dependent frequency shift. Based on the accumulated mass during the sample interval and the total flow volume a mass concentration of particulate matter in the smoke stream can be determined in about 5 minute intervals and compared to a commercial DustTrak Aerosol Monitor 8530 from TSI Inc., Shoreview, MN, USA. Filtering was found necessary to reduce errors which are difficult to calibrate. Although the described sensor can provide a volumetric mass concentration of particles having an average diameter below 2.5 μm, the sensor does not elucidate a chemical composition or structural information other than an upper dimension of the particulate matter. Further, information on particle concentration is provided in approximately 5 minute interval. Also cumulative adsorption of particulate matter onto the SAW sensor increases a likelihood of time-dependent errors and/or warrants regular maintenance, e.g. calibration, cleaning or exchange of the SAW surface.

In addition to the mentioned in-line or semi-in-line sensing methods there are a number of off-line characterization methods. In these methods particulate matter is collected from an aerosol stream by an appropriate filtering method for a give time. After a given sample time sufficient solid particulate matter is collected for conducting a mass, dimension, shape, and/or compositional characterization using for example (electron) microscopic and/or spectroscopic methods. However, these characterization methods, typically require large and/or expensive tools which typically cannot be used at a desired test site. Further, due to a relatively low concentration of particulate matter in ambient air, sample times and/or intervals between measurements may be long.

Accordingly there remains a need for a sensor which is advantageously allows fast in-line identification of particulate matter comprised in an aerosol.

SUMMARY

Aspects of the present disclosure relate to a device for in-line identifying a chemical composition of particulate matter in an aerosol. The device comprises an impactor arranged to divert a received aerosol stream having an initial particulate matter concentration from an impactor inlet to an outlet stream having a decreased particulate matter concentration smaller than the initial particulate matter concentration at a first impactor outlet and a sensing stream having an increased particulate matter concentration larger than the initial particulate matter concentration at a second impactor outlet. The device further includes an optical flow cell. The flow cell comprises: a flow cell inlet fluidly connectable to the second impactor outlet, a flow cell outlet, an elongate hollow wave guide, a light inlet, and a light outlet for in-coupling and out-coupling of light. The optical flow cell defines a gas flow path along the elongate hollow waveguide between the flow cell inlet and flow cell outlet, and an optical path along the elongate hollow wave guide between the light inlet and the light outlet. The gas flow path and the optical path at least in part follow a common trajectory to allow light travelling along said common trajectory to interact with the particulate matter comprised in the sensing stream. Preferably a length of the common trajectory is selected to have a detectable material specific absorbance per unit length per unit concentration at one or more wavelengths of the light.

The invention aims to facilitate in-line spectral characterization of particulate matter normally commonly present in ambient air at a concentration beyond a detection limit of real-time spectral characterization methods operating without concentrator devices, e.g.

Advantageously, the interaction between light travelling along said common trajectory and the particulate matter comprised in the sensing stream e.g. allows determining a finger print absorption spectrum characteristic of a chemical composition of said particulate matter. Said absorption spectrum may suitably be obtained using a combination light and sensing means as described herein. For example, a light sensor arranged to detect an intensity of light as a function of wavelength.

By having light and the particle containing gas stream, i.e. the sensing stream, travelling along a common pathway advantageously allows increasing a detected absorbance level.

By feeding the elongate hollow wave guide with a output of the impactor) in combination with providing a common trajectory of a given length the device allows characterization of particulate matter normally known to be present in a concentration beyond a detection limit of other devices.

By fluidly connecting the second outlet of the impactor to the optical flow cell the sensing stream, e.g. the particle concentration and/or chemical particle composition may be analyzed in-line. In-line analysis may provide faster results of an ambient air quality measurement to an operator. Faster, e.g. direct or near-real time, air quality information may be of particular relevance in potential hazardous environments, such as on work-sites.

Preferably, the impactor is arranged to provide a sensing stream having a particulate matter concentration which value is 100 to 100000 times (e.g. 1000 or 10000 times) larger than a value of the initial particulate matter concentration in the received aerosol stream. To this end, the device may be preferably arranged to control the relative flow rates of the outlet stream and sensing stream leaving the impactor. By controlling the relative flow rates the concentration of particulate matter in the sensing stream may be suitably controlled. As such, the impactor may be understood to be a tunable concentrator arranged to provide a sensing stream having a tunable particulate matter concentration.

According to a further aspect the invention relates to methods for in-line identification of a chemical composition of particulate matter comprised in an aerosol. The devices according to the invention may be particularly useful for applying the methods for in-line identification of a chemical composition of particulate matter comprised in an aerosol. The method comprises: providing an aerosol stream having an initial particulate matter concentration to an inlet of an impactor. In the impactor the received aerosol stream is diverted to an outlet stream and a sensing stream. The outlet stream exits the impactor at a first impactor outlet. The sensing stream exits the impactor at a second impactor outlet, different from the first outlet. The outlet stream has a decreased particulate matter concentration compared to the initial particulate matter concentration. The sensing stream has an increased particulate matter concentration compared to the initial particulate matter concentration. According to the method the sensing stream and light are guided along a common trajectory in an elongate hollow wave guide of an optical flow cell. The flow cell comprises: a flow cell gas inlet fluidly connectable to the second impactor outlet, a flow cell gas outlet, and a light inlet and light outlet for in-coupling and out-coupling of light. An absorbance at one or more wavelengths of the light after travelling along said common trajectory is detected for identification of a chemical composition of particulate matter comprised in an aerosol.

As will be clarified further herein below guiding the sensing stream and light along a common trajectory in an elongate hollow wave guide the light may advantageously have an increased interaction with the particulate matter comprised in the sensing stream.

As will be clarified further herein below a length of the common trajectory is selected to have a detectable material specific absorbance per unit length per unit concentration at one or more wavelengths of the light.

BRIEF DESCRIPTION OF DRAWINGS

These and other features, aspects, and advantages of the apparatus, systems and methods of the present disclosure will become better understood from the following description, appended claims, and accompanying drawing wherein:

FIG. 2A provides a schematic cross section side view of an impactor;

FIG. 2B schematically depicts a perspective view of an impactor;

FIG. 2C provides a photo of an impactor;

DESCRIPTION OF EMBODIMENTS

Figure 1A:
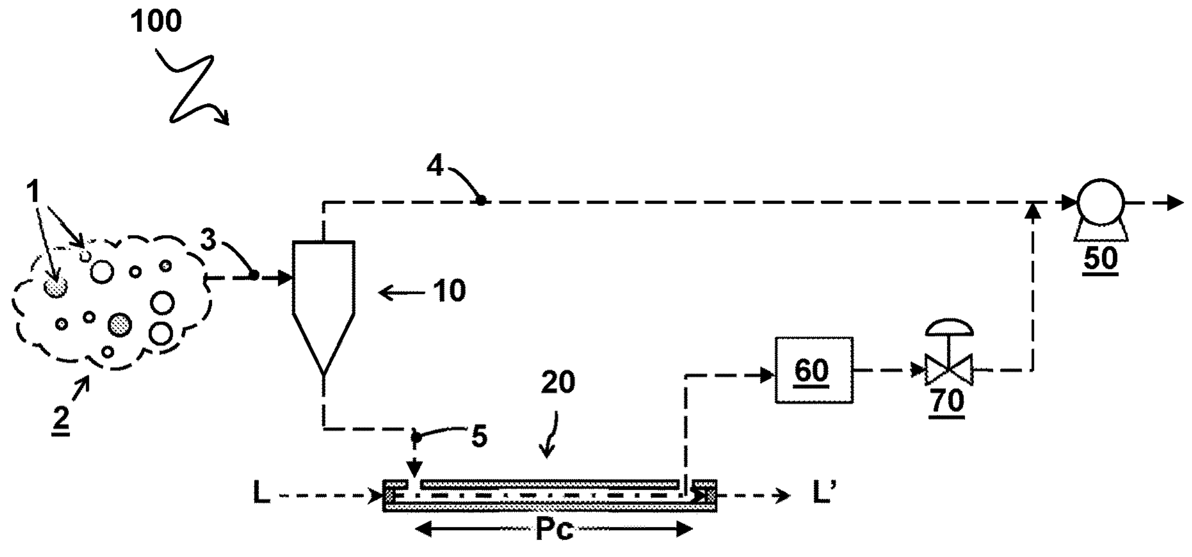
FIG. 1A schematically depicts a device for identifying a chemical composition of particulate matter in an aerosol.

Terminology used for describing particular embodiments is not intended to be limiting of the invention. As used herein, the singular forms “a”, “an” and “the” are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

As used herein, the term 'particulate matter concentration' may be understood to refer to a concentration in mass of particulate matter per volume unit of gas. For example, an aerosol specified to have a PM2.5 content of 500 μg per cubic meter may be understood to refer to an aerosol comprising particulate matter having an average diameter up to 2.5 micrometer in an amount of 500 micro gram per cubic meter of air (at ambient temperature and standard pressure (e.g. at 1 bar and at 20° C.).

As used herein, the term 'in-line identification' may be understood to be an near real-time identification, i.e. so that a result may be obtained without sample collection over a prolonged period of time so that a result may be obtained within one minute, preferably within faster, e.g. within 30 seconds. In-line identification methods include methods in which a sample identification step is performed essentially directly following a sample collection step. In-line identification methods include methods wherein sample collection and identification is performed in a continuous process flow, e.g. in the same device.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 3A:
FIG. 3A provides a schematic cross section side view of an optical flow cell.
Figure 3A:
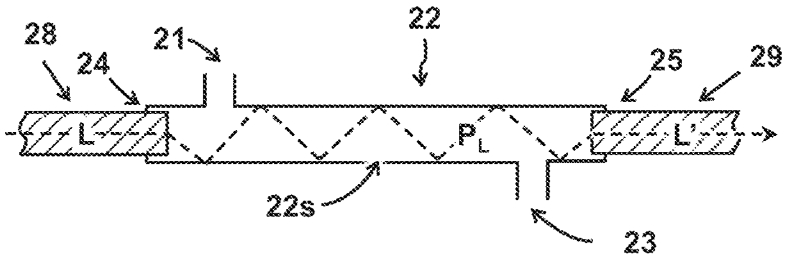

Now with reference to FIGS. 1-3 the device according to the invention will be elucidated. FIG. 1A depicts a device 100 for in-line identifying a chemical composition of particulate matter 1 in an aerosol 2. The aerosol may comprise a complex mixture of particulate matter. The complex mixture may be understood to include different size particles and/or particles of different composition, e.g. a particles having a different chemical composition or a different physical composition, e.g. crystal structure and/or density. In the figure the complex mixture of particles comprised in the aerosol is schematically illustrated by differently dimensioned and/or differently shaded particles 1.

With reference to FIGS. 1A and 2A, the impactor 10 is arranged to divert a received aerosol stream 3 having an initial particulate matter concentration $C_i$ from a impactor inlet 11 to an outlet stream 4 having a decreased particulate matter concentration $C_O$ smaller than the initial particulate matter concentration $C_i$ at a first impactor outlet 12 and a sensing stream 5 having an increased particulate matter concentration Cs larger than the initial particulate matter concentration $C_i$ at a second impactor outlet 13. The flow rates (schematically indicated by the width of the block-arrows in FIG. 2A) of the sensing stream 5 is typically smaller that the flow rate of the outlet stream 4.

Figure 1B:
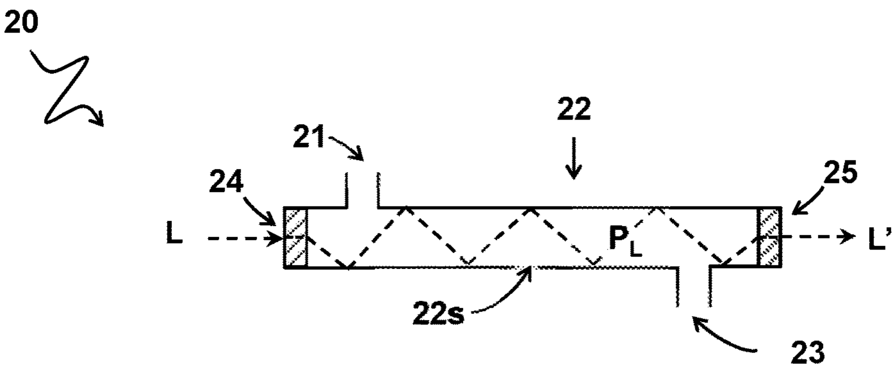
FIG. 1B schematically depicts a cross section side view of an optical flow cell with an indicated optical path.
Figure 1C:
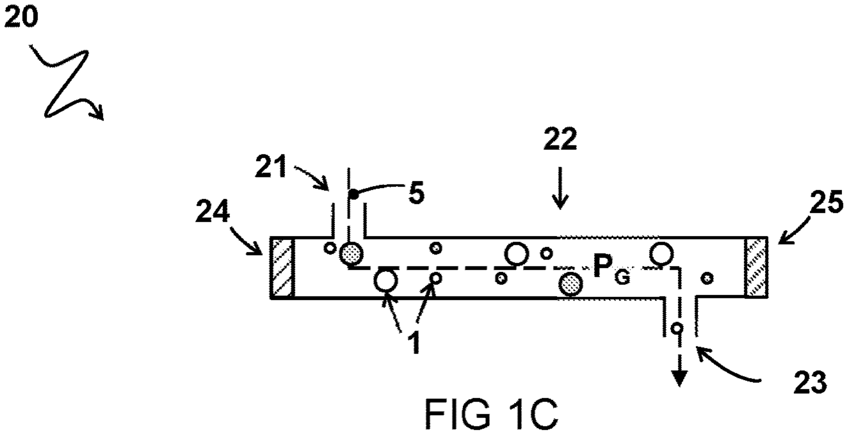
FIG. 1C schematically depicts a cross section side view of an optical flow cell with an indicated gas flow path.

With reference to FIGS. 1A-C the device 100 comprises an optical flow cell 20. The optical flow cell 20 includes at least:

- a flow cell inlet 21 which is fluidly connectable to the second impactor outlet 13,
- a flow cell outlet 23,
- an elongate hollow wave guide 22, and
- a light inlet 24 and a light outlet 25 for in-coupling and out-coupling of light As illustrated, e.g. in FIGS. 1B and 1C, the optical flow cell defines:

- a gas flow path $P_G$ along the elongate hollow wave between the flow cell inlet and flow cell outlet, and
- an optical path $P_L$ along the elongate hollow wave guide 22 between the light inlet 24 and the light outlet 25.

The gas flow path $P_G$ and the optical path PL at least in part follow a common trajectory $P_C$ (see FIG. 1A) to allow light travelling along said common trajectory to interact with the particulate matter 1 comprised in the sensing stream 5. A length of the common trajectory $P_C$ is preferably selected to have a detectable material specific absorbance A per unit length per unit concentration at one or more wavelengths λ of the light L.

The invention aims to facilitate in-line spectral characterization of particulate matter normally known to be present in a concentration beyond a detection limit of other devices. Advantageously, the interaction between light travelling along said common trajectory and the particulate matter 1 comprised in the sensing stream e.g. allows determining a finger print absorption spectrum S characteristic of a chemical composition of said particulate matter 1. Said absorption spectrum may suitably be obtained using a combination of light sources and sensing means as described herein.

Guiding light L and the sensing stream 5 along a common pathway advantageously allows increasing a detected absorbance level by determining a frequency dependent intensity of light L' (i.e. the light L after interacting with the particulate matter along the common trajectory $P_C$.

By feeding the elongate hollow wave guide 22 with an output of the impactor 10 i.e. the sensing stream 5 in combination with providing a common trajectory $P_C$ of a given length the device allows characterization of particulate matter normally known to be present in a concentration beyond a detection limit of other devices.

Preferably, the optical path $P_L$ and gas flow path $P_G$ are essentially parallel such as to increase an amount of particles light can interact with along the common trajectory $P_C$.

The impactor 10 may be suitably selected from a group consisting of real and virtual impactors, including cyclones, microcyclones, cascade impactors, microfluidic virtual impactors, and combinations thereof.

Advantageously, the impactor 10 serves as a concentrator, concentrating the aerosol, i.e. increasing the concentration of particulate matter from an initial concentration $C_i$ in the received aerosol stream 3 to an increased concentration Cs in the sensing stream 5. Increasing the concentration of particulate matter in the sensing stream 5 can improve optical identification of a chemical composition of particulate matter comprised in the aerosol. In other words, the concentration of particulate matter improves the level of interaction between particles and light traveling along the gas flow path P. Increasing particle concentration may reduce a detection limit for identification of a chemical composition and/or an improve a signal to noise level in for determining the finger print absorption spectrum characteristic of a chemical composition of said particulate matter 1.

By fluidly connecting the second outlet of the impactor to the optical flow cell advantageously allows analyzing the sensing stream, e.g. the particle concentration and/or chemical composition of said particles in an in-line fashion. In-line analysis may provide faster results of an ambient air quality measurement to an operator or user compared to known methods relying on separated collection of particles followed by of off-line analysis thereof. Faster, e.g. direct or near-real time, air quality information may be of particular relevance in potential hazardous environments, such as on work-sites.

Figure 3B:
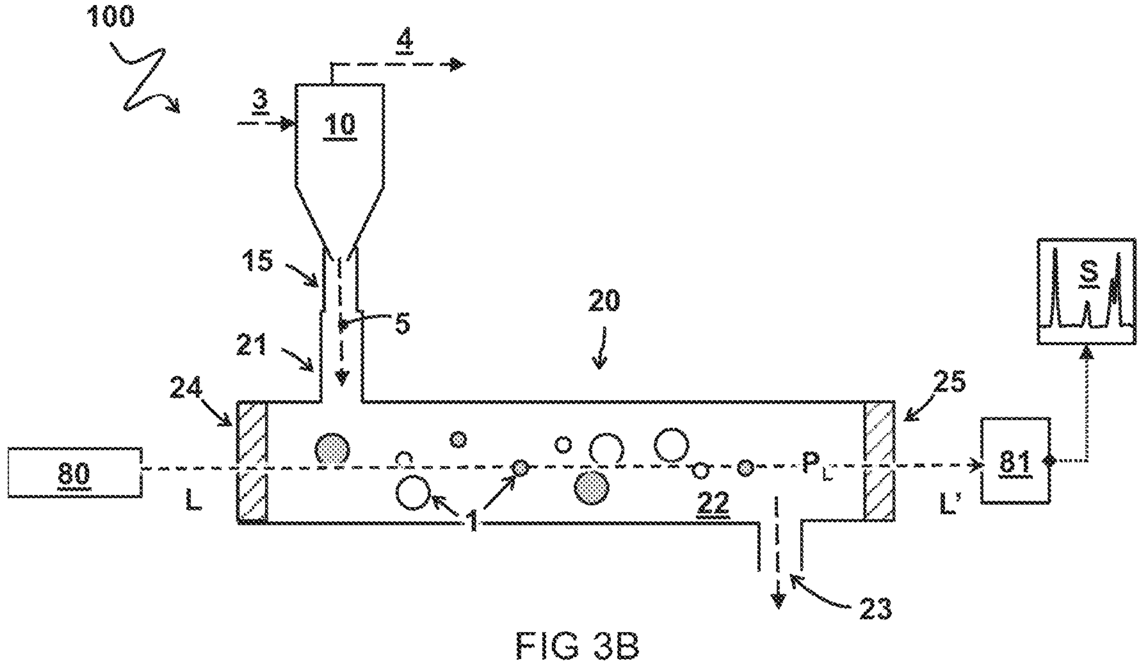
FIG. 3B schematically depicts a device for identifying a chemical composition of particulate matter in an aerosol including a light source and detector.

In some embodiments, e.g. as shown in FIG. 3B, the impactor is permanently connected to the optical flow cell via a connection member 15, e.g. a length of tubing. In a preferred embodiment the impactor is reversible connectable to the optical flow cell via a reversibly connectable connection member 15, e.g. a length of tubing. Providing a reversibly connectable connection member advantageously allows suitable exchange of parts and/or maintenance or inspection of individual components.

In another or further preferred embodiment, the inner diameter of the elongate hollow wave guide 22 is at least 10 times a dimension of the largest particle comprised in the sensing stream 5. Typically the sensing stream may comprise particles having an average diameter of less than 100 μm. Particles having a larger diameter are preferably removed prior to entering the optical flow cell 20 as larger particles may induce a clogging risk and/or may, depending on a penetration depth of the light, contribute less to detected absorbance than comparatively smaller particles. A dimension of the largest particle comprised in the sensing stream may be suitably controlled by providing a filtering means, e.g. a HEPA filter, prior to the flow cell inlet 21. Typically the inner diameter of the elongate hollow wave guide 22 has a value in excess of 0.5 mm, e.g. larger than 1 mm, e.g. in a range between 0.5 and 10 mm, e.g. in a range between 1 and 5 mm. By having an inner diameter at least 5 times larger diameter than a dimension of the largest particle comprised in the sensing stream reduces a risk of clogging of the elongate hollow wave guide 22, e.g. due to agglomeration of particular matter. Increasingly larger inner diameters, e.g. 1, 2 or even 5 mm advantageously have a comparatively lower flow resistance and/or may be easier to visually inspect and/or clean.

In a preferred embodiment the flow cell inlet 21 and flow cell outlet 23 each individually have an inner diameter which is no larger than the inner diameter of the elongate hollow wave guide 22. Preferably the diameter is smaller, e.g. in a range between 0.1 and 0.9 times the inner diameter of the elongate hollow wave guide 22. Flow cell inlet and outlets 21, 23 having smaller diameters advantageously reduce a fraction of light coupled into the system from leaking out. The fraction of light leaking e.g. reflecting into the flow cell inlet 21 and/or flow cell outlet 23 may not be available for detection and accordingly reduce device performance. In absolute terms the flow cell inlet 21 and flow cell outlet 23 each individually have an inner diameter typically have an inner diameter with a value in a range between 0.5 and 10 mm, preferably between 0.5 and 9 mm, more preferably in a range between 0.5 and 5 mm, even more preferably in a range between 0.5 and 2 mm, e.g. between 0.5 and 1 mm or between 1 and 2 mm.

The length of the common trajectory PC can be selected in dependence of a concentration of particulate matter to be detected and/or on a noise level of an optical detector. The length should be sufficiently high for attaining an absorption signal beyond a detection limit of the optical detector, yet short enough not to loose too much light in the waveguide. In a preferred embodiment, a length of the common trajectory $P_C$ is selected to have an absorbance in a range between 0.005 and 0.99, preferably to have an absorbance of at least 0.01, e.g. in a range between 0.1 and 0.85, more preferably at least 0.05, most preferably at least 0.15, e.g. in a range between 0.25 and 0.75. The longer the common trajectory $P_C$, the higher the absorbance, the higher the signal quality can be and/or the lower a detection limit can be. It will be appreciated that there will be an upper limit for the length of the common trajectory $P_C$. To reduced a fraction of in coupled light that may be lost in the waveguide a maximum length may be 100 cm or less, e.g. 30 cm. Shorter lengths of the common trajectory $P_C$ advantageously can reduce a dimension of the device increasing portability.

In some preferred embodiments, the length of the common trajectory $P_C$ is in a range between 5 mm and 100 cm, e.g. between 0.5 cm and 50 cm, e.g. 20 mm, 4 cm, or 20 cm. The length of the common trajectory $P_C$ and accordingly the length of the elongate hollow wave guide 22 may depend on the type and/or concentration of particulate matter particles that are expected to be present in the aerosol. A longer common trajectory $P_C$ may be preferred for devices arranged to identify particles present in an aerosol in a low concentration and/or particles having a comparatively low optical absorption coefficient. By providing a longer elongate hollow wave guide 22 the optical path LP and gas flow path $P_G$ may overlap over a longer distance allowing generation of a signal of higher quality (intensity). Shorter lengths may be preferred for devices aimed to measure particles having a comparatively larger optical absorption coefficient and/or particles present in a comparatively high concentration. Shorter lengths of the elongate hollow wave guide 22 may be particularly preferred for devices having a short response time as a comparatively longer elongate hollow wave guides require a longer period to refresh the contents thereof.

It will be appreciated that the volume of gas flow path $P_G$ from the second impactor outlet 13 up to and including the elongate hollow wave guide 22 is preferably as small as possible. In some preferred embodiments, an internal volume of the fluid connection between impactor 10 and optical flow cell 20, e.g. the connection member 15, is minimized. Minimizing the internal volume of the of the fluid connection between impactor 10 and optical flow cell 20 reduces a time required for a sensing stream 5 exiting the impactor 10 to reach the elongate hollow wave guide 22. For example, the internal volume and length of the fluid connection, e.g. piping or hoses, between the impactor outlet 13 and the flow cell inlet 21 a length less than 5 cm and/or a total volume below five cubic millimeter, preferably the length and/or volume are less, e.g. less than 2 cm and/or less than 2 cubic millimeter. The smaller the internal volume of the of the fluid connection the faster the response time can be.

In some embodiments, the device further comprises a light source 80 and/or a light detector 81, e.g. as shown in FIG. 3B. The light source is arranged to provide the light to the light inlet 24. The light detector (sensor) is arranged to receive light from light outlet (after interacting with particulate matter in the optical flow cell 20).

In a preferred embodiment, the light source and detector are adapted to measure absorption of the light at multiple wavelengths, e.g. to determine a spectral signature S. In one embodiment, a broad band light source is used, e.g. spanning a wavelength range of more than hundred nanometer. Most preferably, a light source such as a heating element is used to emit infrared light in a wavelength between 700 nm-1 mm, preferably in a near infrared range between 0.75-1.4 μm and/or a mid infrared range 3-20 μm. For example, such wavelengths may be particularly suitable for determining spectral signatures of compounds as described herein. Also other wavelengths can be used, e.g. visible or UV.

In another or further embodiment, a tunable light source is used, e.g. capable of simultaneously or consecutively tuning the wavelength over a range of at least hundred nanometer. In some embodiments, a spectral resolving element is used to distinguish different wavelengths. For example, the spectral resolving element comprises a grating or prism. Also other means for distinguishing wavelengths can be envisaged, e.g. one or more dichroic mirrors. In one embodiment, a sensor comprising multiple sensing elements is used, e.g. wherein a spectrum of the light is spatially projected over different sensing elements. In another or further embodiment, a sweeping wavelength is consecutively measured by one or more sensor elements.

Infra red light is well known for having well-defined material specific absorption characteristics. For example, IR spectroscopy, e.g. Fourier transform IR spectroscopy is a well known method for chemically identifying a broad range of materials. In IR spectroscopy a peak position or a combination of peak positions in a spectrogram of a test specimen may advantageously be used to identify a material or type of materials present in a test specimen. The intensity of specific absorption peaks may further advantageously correlate to a an amount or concentration.

Alternatively, the light source can be a thermal broad band MID-IR emitter and the sensor a broad band thermal detector. The wavelength dependence of the absorption can then be derived using specific band-pass filters that only allow a small spectral band to pass, tuned to the absorption bands of the particulate matter.

In some embodiments, the light inlet 24 and/or light outlet 25, e.g. as shown in FIGS. 1B, 1C, and 3B, are suitable formed of a material having a low absorption i.e. high transmittance in a relevant optical region, For example, optical glass, quartz, sapphire, potassium bromide, or silicon, zinc selenide or other chalcogenide glasses, each advantageously having a material specific transmissive properties for light having a wavelength within a certain bandwidth (e.g. IR radiation having a wavelength from about 0.7 μm to about 20 μm, or UV/vis radiation having a wavelength of about 0.7 μm down to about 200 nm.) Using a light inlet 24 and/or light outlet 25 suitably formed of a material having a low absorption i.e. high transmittance over a relevant optical frequency range advantageously maximized signal intensity, e.g. reduces an amount of signal lost due to unspecific absorption at the inlet/outlet.

The impactor 10 may be suitable selected from a group consisting of real and virtual impactors, including cyclones, microcyclones, cascade impactors, and combinations thereof. Impactors are commonly known as reliable means for purifying an incoming aerosol stream, and supplying a purified output stream having a reduced a concentration of particles. Depending on type and/or operation conditions particles with a dimension larger than a cut-off dimension may be filtered off. In known impactor applications the separated particles are normally collected over time and discarded. Optionally collected particles may be analyzed off-line. The present invention advantageously directs a stream comprising the separated particles directly to an identification means.

In some embodiments, the impactor 10 is arranged to provide a sensing stream 5 having a particulate matter concentration Cs which value is 100 to 100000 times (e.g. 1000 or 10000 times) larger than a value of the initial particulate matter concentration $C_i$ in the received aerosol stream 3. The impactor 10 may be suitably selected from a group consisting of real and virtual impactors, including cyclones, microcyclones, cascade impactors, microfluidic channel virtual impactors, and combinations thereof. Impactors are a known and reliable means for purifying an incoming aerosol stream and supplying an output stream with a reduced a concentration of particles. Depending on type and/or operation conditions particles with a dimension larger than a cut-off dimension may be filtered off. Typically, the separated particles are collected and discarded or optionally analyzed off-line. Inventors found that the separated particulate matter may advantageously be directed with a gas stream to an identification means. Advantageously, impactors may be provided as passive units requiring no internal moving parts or supply of internal power.

Preferably, particle separation in the impactor is based on differences in inertia of various particles comprised in the aerosol, e.g. differences in mass and/or velocity. Inventors found that in dependence of design parameters of the impactor, e.g. dimension and/or shape, and/or the flow rate of the received aerosol stream 3 may advantageously be used to affect the particle separation in the impactor. For example, a higher flow rate of the received aerosol stream 3 will typically lead to a lower relative concentration of particles in the purified outlet stream 4 and simultaneously a comparatively higher relative concentration of particles in the sensing stream 5. In other words, for a given impactor geometry and dimension the incoming flow rate may affect how much and which size fraction of the particles from the incoming stream are diverted to the outlet stream 4 and sensing stream 5 respectively. This may hold both for the absolute number of particles in a given size bandwidth as for the distribution of particle mass over the respective streams. For example, for a given constant ratio between the flow rate of outlet stream 4 and the flow rate of the sensing stream 5 a higher flow rate of the received aerosol stream 3 may lead to an improved separation of the particulate matter comprised in the received aerosol stream 3; a higher flow rate of the received aerosol stream 3 may cause an increased fraction of particles of a given dimension to be diverted to the sensing stream 5 and to a an increased abundance of particles of smaller dimensions. Accordingly, setting or controlling of the flow rate of the received aerosol stream 3 may advantageously be used to adjust the size and/or concentration of particulate matter in the sensing stream 5, and thus be used as a particle size detector Advantageously, the impactor 10 serves as a concentrator, concentrating the aerosol, i.e. increasing the concentration of particulate matter from an initial concentration $C_i$ in the received aerosol stream 3 to an increased concentration Cs in the sensing stream 5 (see FIG. 2A). Increasing the concentration of particulate matter in the sensing stream 5 can improve optical identification of a chemical composition of particulate matter comprised in the aerosol. The concentration of particulate matter improves the level of interaction between particles and light traveling along the gas flow path P. Increasing particle concentration may reduce a detection limit for identification of a chemical composition and/or an improve a signal to noise level in for determining the finger print absorption spectrum characteristic of a chemical composition of said particulate matter 1.

In some embodiments the impactor is arranged to redirect essentially all particles having a mass within a desired mass range towards the sensing stream 5. This may for example, be attained by suitable dimensioning of the impactor and/or by applying a suitable flow rate, e.g. flow velocity. Essentially redirecting all particles having a mass within a desired range towards the sensing stream can allow maximizing the concentration of said particles in the sensing stream 5 and may accordingly reduce a detection limit and/or improve a signal to noise ratio for an optical measurement in the optical flow cell 20.

Inventors found that for an impactor 10 arranged to substantially direct all particles having a mass within a desired mass range towards the sensing stream a concentrating factor $C_i$/Cs for said particles in the sensing stream 5 relative to the outlet stream 4 may be estimated by the relative flow rates in said streams. Advantageously, the concentration factor may conversely be determined by controlling the relative flow rates of the outlet stream 4 and the sensing stream 5.

Accordingly, in other or further preferred embodiments, the device 100 is arranged to control the relative flow rates (e.g. the flow ratio) of the outlet stream 4 and sensing stream 5 leaving the impactor 10. By controlling the relative flow rates the concentration of particulate matter in the sensing stream 5 may be suitably controlled. Accordingly, the impactor 10 may be understood to be a tunable concentrator arranged to provide a sensing stream 5 having a tunable particulate matter concentration Cs which is 100 to 100000 times, e.g. 1000 or 10000 times, higher than the initial concentration $C_i$ in the received aerosol stream 3. Inventors found that a desired concentrating factor may be attained by suitably controlling the relative flow rates of the outlet stream 4 and sensing stream 5 leaving the impactor 10.

Accordingly, in a preferred embodiment, the device comprises and/or is used in an assembly comprising a means 50 to provide an aerosol flow through the device. For example, the device may be provided with or operated in an assembly comprising a blower or pump 50, e.g. as shown in FIG. 1A. In one embodiment, the means to provide an aerosol flow through the device may be provided before impactor inlet 11.

Preferably the means 50 to provide an aerosol flow through the device, e.g. a pump or combination of means, e.g. plurality of pumps, acts on both the first impactor outlet 12 and the second impactor outlet (13), preferably at a downstream position of the flow cell outlet 23, e.g. as shown in FIG. 1A. Positioning the means to provide an aerosol flow through the device at a down stream position of the optical flow cell 20 can mitigate possible contamination to the particles, e.g. due to lubricants in use in the means. Positioning the means to provide an aerosol flow through the device at a down stream position of the optical flow cell 20 can further mitigates damage to the particles comprised in the aerosol, e.g. mechanical damage to the particles, e.g. caused by impact of particles with moving pump parts. Even more preferably, the device uses a single means to provide drive an aerosol flow through the device, e.g. one pump or blower. Use of a single means to drive an aerosol flow through the device which acts on the first impactor outlet 12 and the second impactor outlet as a downstream position of the flow cell outlet 23 may be attained by positioning said means along a joint exit flow path comprising the flows from first impactor outlet 12 and the flow cell outlet 23, e.g. as shown in FIG. 1A. Accordingly in a preferred embodiment the first impactor outlet 12 and flow cell outlet 23 are fluidly connected to a common outlet, e.g. as shown. In some embodiments, e.g. as shown the device 100 is provided with means to selectively control an overall flow rate through the impactor 10, e.g. pump 50, and a means to selectively adjust the flow rate of the outlet stream 4 and of the sensing stream 5, e.g., valve 70.

In one embodiment, the flow rate of the aerosol flow provided to the impactor 10 is measured. Measuring a flowrate of the aerosol stream provided to the impactor 10 can allow the size and/or concentration of particulate matter in the sensing stream to be determined, e.g. by using calibration data recorded for an aerosol stream of known composition.

The relative flow rates of the outlet stream 4 and sensing stream 5 distribution leaving the impactor 10 can be governed by relative flow resistance of these streams along the various components of the device. For example, the outlet stream 4 leaving the impactor 10 to flow into ambient via a comparatively wide first impactor outlet 12 opening will experience a comparatively lower flow resistance than the sensing stream 5 leaving the impactor 10 via a comparatively smaller a second impactor outlet 13 opening and subsequently flowing though the elongate hollow wave guide 22 before exiting into ambient.

In a strongly preferred embodiment the device 100 is arranged, e.g. provided with means to selectively adjust the flow rate of one or more of the outlet stream 4 and sensing stream 5. Selectively adjusting the flow rate of one or more of the outlet stream 4 and sensing stream 5 may allow tuning, e.g. setting, adjusting, the relative flow rates of the outlet stream 4 and sensing stream 5 leaving the impactor. Tuning the relative flow rates of the outlet stream 4 and sensing stream 5 leaving the impactor may advantageously allows controlling, setting, selecting or adjusting the fraction and/or concentration of particulate matter comprised in the received aerosol stream 3 which is diverted to and received in the optical flow cell 20. Means to selectively adjust the flow rate include but are not limited to a pumps or blowers with a tunable flow rate. Alternatively, the flow rate may be regulated using one or more separate flow rate regulators, e.g. a mass flow controller or a critical orifice element.

In some preferred embodiments, the impactor 10 is a cyclone, preferably a microcyclone, e.g. as shown in FIGS. 2B and 2C. In contrast to conventional cyclones designed to supply a purified air stream from a first impactor outlet 12 by collecting separated particles, e.g. dust at a bottom portion of the cyclone, cyclones according to the invention are suitably provided with an a second impactor outlet 13 from which a sensing stream 5 comprising separated particles can continuously leave the cyclone and directed towards the optical flow cell 20. Provision of a second impactor outlet 13 reduces a risk of clogging of the cyclone and/or reduces a need for maintenance (e.g. cleaning of the cyclone). A continuous gas stream out of the a second impactor outlet 13 carries particulate matter from the received aerosol stream 3 out of the impactor and reduces settling and/or formation of dense agglomerates of particles within the impactor. Hereby reducing a risk of clogging. A microcyclone may be understood to be a cyclone arranged to essentially redirect particulate matter to the sensing stream 5 using an flow rate of the received aerosol stream 3 in a range from about 50 to 10000 mL/minute, e.g. between about 1000 to 5000 mL/min. Advantageously, a microcyclone can be dimensioned and/or operated at a condition such as to essentially direct all particulate matter within a given size range e.g. PM2.5 or PM 4.0, from a received aerosol stream 3 to the optical flow cell 20.

Inventors experimentally found that the flow rate of a sensing stream (i.e. out of the second impactor outlet 13) was controllable over a range of 10 to 200 mL per minute from a received aerosol stream at a flow rate of about 6000 mL/min using a microcyclone, e.g. as shown in FIGS. 2B and 2C, having an inner main housing height w of about 20 mm, an inner housing diameter D10 of about 13 mm, a cone height (h10 minus w) of about 27 mm, a bottom cone diameter D13 of about 4 mm, an impactor inlet 11 at a side wall of the housing having a dimension (h11, D11) of about 1.5 mm, a first impactor outlet 12 at an upper portion of the main housing having a diameter D12 of about 2 mm and a second impactor outlet 13 at a bottom surface of the cone 12 with a diameter D13 of about 2 mm. The remainder of the received aerosol stream 3 was directed to the outlet stream 4. Accordingly, the concentrating factor was obtained in a range of about 120 to 600. It will be appreciated that in case different concentration factors are desired the relative flow rates may be adjusted accordingly.

In a preferred embodiment the device 100 is provided with a separate filter to filter off excessively large particles, e.g. self-settling particles, e.g. particles larger than 100 μm, and/or particles larger than 10 μm. Such filters may include e.g. a HEPA filter or any other filter arranged to filter off particles having a dimension larger than a given value.

Figure 4A:
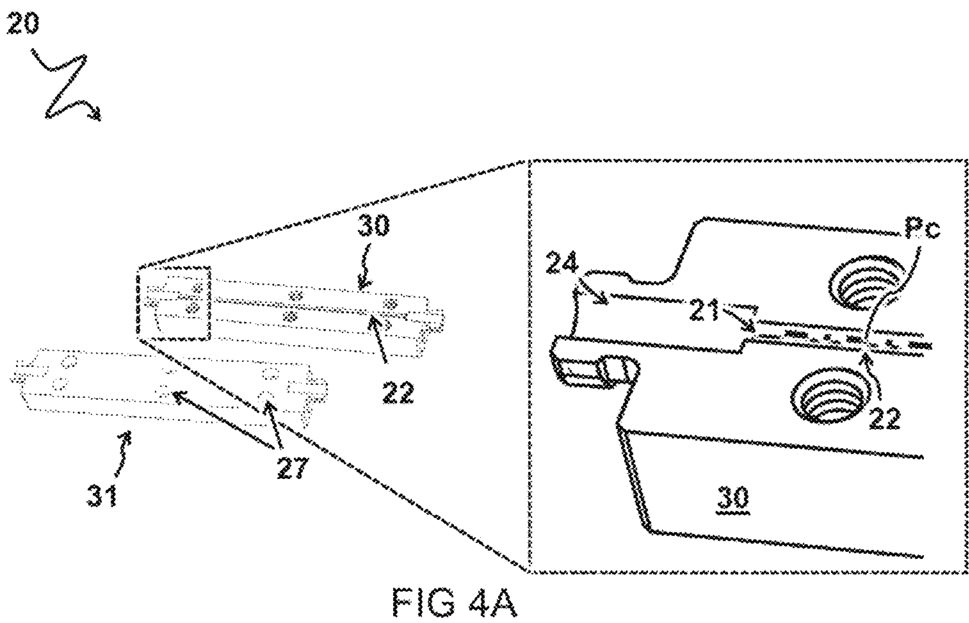
FIG. 4A provides a photo of two body members (left) for assembling an optical flow cell having a straight flow channel, and a close-up (right)

The hollow waveguide can be an elongate capillary, such as a glass, metal or plastic tube. Preferably, one or more inner side-walls 22*s* of the hollow wave-guide are optically reflective or at least partially coated with an optically reflective coating, e.g. as shown in FIG. 3A. Provision of an optically reflective sidewall and/or optically reflective coating advantageously increases the fraction of light coupled into the elongate hollow wave guide 22 that propagates along the optical path LP that may be received at the light outlet 25. Provision of an optically reflective sidewall or optically reflective coating can further advantageously increases a length of the common trajectory $P_C$ as light repeatedly bounces of sidewalls of the elongate hollow wave guide 22 while the elongate hollow wave guide 22 comprises the sensing stream 5. Provision of an optically reflective sidewall/coating may further reduce unspecific loss (scattering/absorption) of light at the inner sidewalls of the elongate hollow wave guide 22. In other or further embodiments, e.g. as shown in FIGS. 4A and B, the elongate hollow wave guide 22 is provided between facing surfaces of at least two adjacent body members 30, 31. Preferably, the elongate hollow wave guide 22 is formed by side walls of a channel. In some embodiments, the channel is provided in the surface of one body member 30 and a lid 31 formed an adjoining body member. The body members may be assembled adjacently to form the elongate hollow wave guide 22. In one embodiment, the member may be provided with means to reversibly affix the body members. This means include but are not limited to holes 27, e.g. as shown, for receiving a matching fixation means such as a screw, but also clamps and magnetic fixing means. Providing the elongate hollow wave guide 22 between two adjacent body members advantageously allows reversible opening and closing of the channel, e.g. for inspection, maintenance and/or cleaning purposes.

The body members may be formed of any suitable material including but not limited to polymeric bodies, metal bodies and composite materials. In one embodiment, a sealant, such as a thin layer of grease, a rubber ring or coating, may be provided between adjoining body members to improve air-tightness of the elongate hollow wave guide 22.

The channel may be formed by any suitable manufacturing method, including but not limited to drilling, milling, etching, and additive manufacturing methods such as 3D printing, or a combination thereof. The channel may have any suitable cross section including but not limited to square or round. The side walls of the elongate hollow wave guide 22, e.g. the channel, are preferably smooth to reduce the fraction of light traveling through the hollow wave guide 22 from being lost for detection due to scattering or unwanted reflections of side walls. By providing the hollow wave guide 22 between two adjacent body members the side walls may be conveniently smoothened, e.g. polished. By providing the hollow wave guide 22 between two adjacent body members the side walls may be conveniently coated with an optically reflective material. In some embodiments, at least one, preferably all of the body members are made of, or are coated with an optically reflective material. Optionally or in addition, a transparent protective layer is added, such as silver iodide. Using body members formed of an optically reflective material, e.g. a metal such as aluminum, silver or gold, may obviate a need for a providing a separate coating material to the one or more side-walls 22*s* of the hollow wave-guide.

Figure 5A:
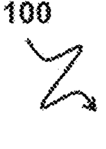
FIG. 5A provides a photo of a device for identifying a chemical composition of particulate matter in an aerosol.
Figure 5A:
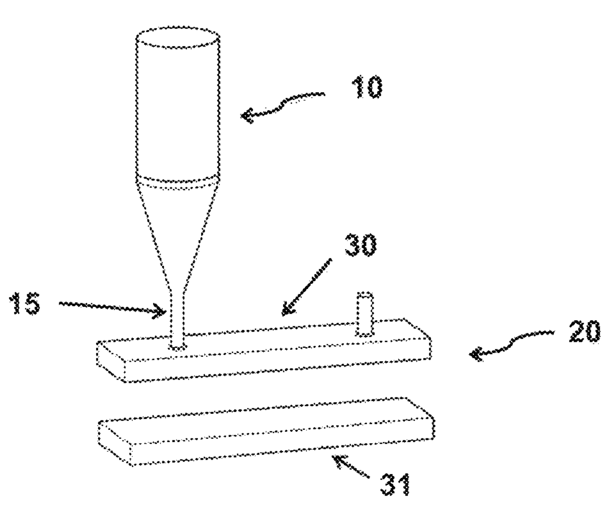

FIG. 5A depicts a photograph of 3D-manufactured body members 30, 31 which when assembled form a microcyclone 10 connected to an optical flow cell 20 via a permanent connecting member.

In some preferred embodiments the light inlet 24 and the light outlet 25 for in-coupling and out-coupling of light are respectively by formed reversibly connectable end portion of an optical inlet fiber 28 and an optical outlet fiber 29 ending in the optical flow cell 20, e.g. as shown in FIG. 3A. Use of optical fibers, e.g. dense glass fibers advantageously allows using the device in combination with an external light source and/or light detector. Use of an optical inlet fiber 28 and/or an optical outlet fiber 29 ending in the optical flow cell 20 was found to result in particularly good in-coupling and/or out-coupling of light of light. Use of an optical inlet fiber 28 and/or an optical outlet fiber 29 ending in the optical flow cell 20 can obviate a need for mirrors and/or lenses to couple light in and out of the elongate hollow wave guide 22. Use of optical fibers can further allow minimizing a gap distance and accompanying losses when incoming light travels across the gap or when outgoing light travels across the gap. Preferably the diameter of the respective optical fibers matches an inner diameter e.g. width of elongate hollow wave guide. Preferably the diameter of the fiber is no less and 0.5 times a diameter of the waveguide, more preferably no less than 0.75 times a diameter of the waveguide. The better the diameter of the fiber matches the diameter of the elongate hollow wave guide 22 the more effectively light may be coupled in or out of the fiber. it will be appreciated that, the diameter of the fiber preferably does not exceed a diameter of the elongate hollow wave guide 22.

Figure 4B:
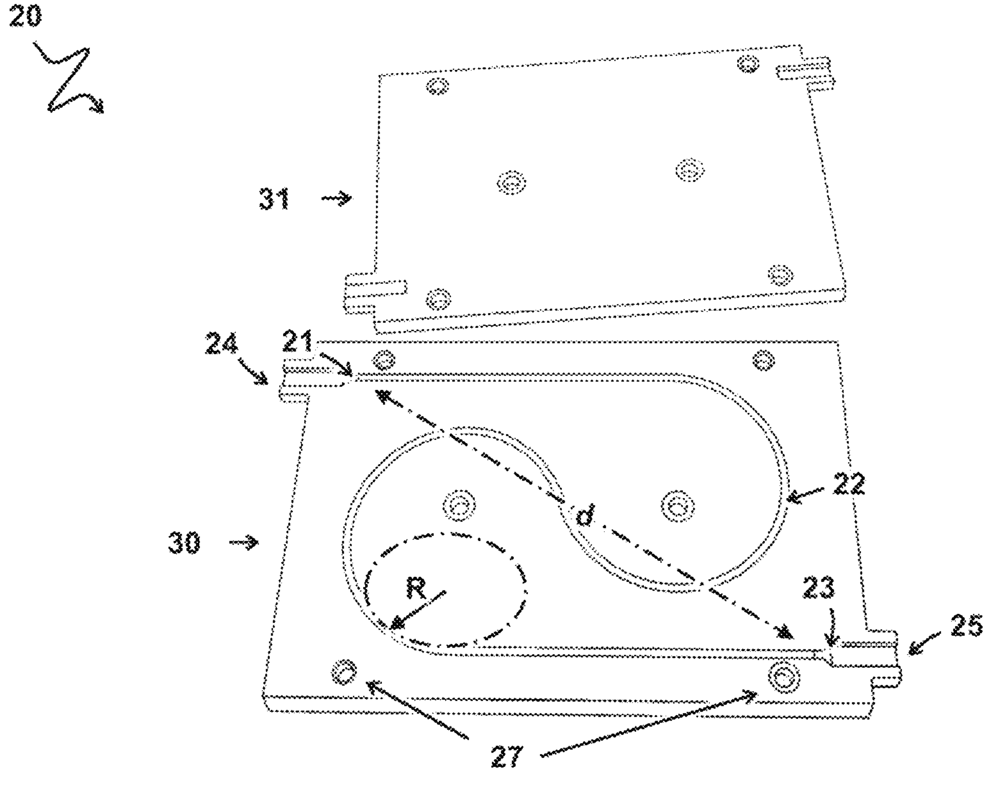
FIG. 4B provides a photo of two body members (left) for assembling an optical flow cell, having a curved flow channel.

In some embodiments, e.g. as shown in FIG. 4B, the elongate hollow wave guide 22 is arranged along a meandering trajectory wherein a distance d (marking the dash-dot arrow in FIG. 4B) between the flow cell inlet 21 and the flow cell outlet 23 is less than the length of the path followed by the gas by a factor of at least 2. Preferably the radius of curvature R (dash-dot circle in FIG. 4B) is larger than one millimeter along the trajectory. The elongate hollow wave guide 22 is preferably arranged such that the optical path $P_L$ is void of local sharp corners or bends <90° such that backward reflections of the light traveling through the elongate hollow wave guide 22 are avoided. By arranging the elongate hollow wave guide 22 along a meandering trajectory an optical flow cell 20 can be provided which synergistically combines a reduced form factor, with an elongate hollow wave guide 22 having an increased total gas volume and increased length of the optical path $P_L$ while reducing undesired reflections.

In some embodiments a selectively activatable valve is provided between the second impactor outlet 13 and the flow cell inlet 21 arranged for providing the sensing stream 5 to the elongate hollow wave guide 22 in a pulse type fashion. In one embodiment, the sensing stream 5 is provided to the elongate hollow wave guide 22 in a pulse type fashion may increase a concentration of particulate matter in the sensing stream 5. Operation in a pulse type fashion also can further help to reduce the length of the waveguide. During operation, the impactor 10 may continuously divert particles comprised in the received aerosol stream 3 towards the second impactor outlet 13. During a given off-period an amount of diverted particles may be collected. During a consecutive on-period the collected amount of particles may flow into the elongate hollow wave guide 22 for analysis. By tuning the on and off-times the concentration of particles in the sensing stream 5 at the elongate hollow wave guide 22 may be suitably increased. For example, by having equal on and off times an average particle concentration in the elongate hollow wave guide 22 may be doubled. Other concentration values may likewise be attained. Increasing a concentration of particles at the elongate hollow wave guide 22 may be of particular relevance for air quality measurements wherein the air comprises low concentrations of particles and/or particles with comparatively low optical absorbance. Advantageously increasing a particle concentration by a pulse-mode operation may be combined with other concentrating means described herein, e.g. controlling a flow-rate, e.g. a flow rate of the received aerosol stream 3, or with controlling a relative ratio of flow rates, e.g. controlling the relative flow rates of the outlet stream 4 and sensing stream 5 leaving the impactor.

Figure 5B:
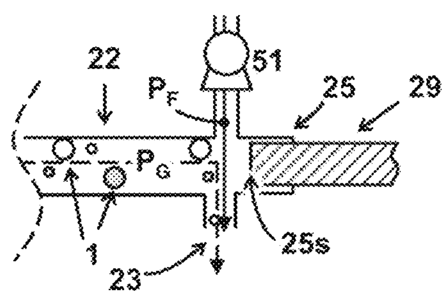
FIGS. 5B and C provide schematic cross section side views respectively detailing end portions of embodiments of optical flow cells.
Figure 5C:
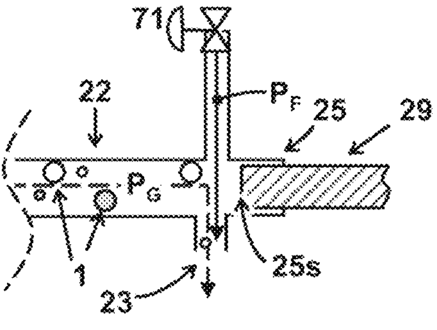

In another or further embodiment, e.g. as shown in FIGS. 5B and 5C, the optical flow cell 20 is arranged to provide a purge flow $P_F$ along one or more of a surface 24*s* of the light inlet 24 and/or along a surface of 25*s* the light outlet 25. Inventors found that during operation, e.g. while a flow of aerosol is being driven through the elongate hollow wave guide 22 particles comprised in said flow may settle on the inner surfaces of the optical flow cell 20. Settled particulate matter may form a contamination layer on the surface of the light in- and/or light outlet may negatively affect an optical absorbance measurement. In particular settling of particles on the light inlet 24 and/or light outlet 25 may negatively affect an ability of the device to identify a chemical composition of particles. Providing a purge flow along a surface 24*s* of the light inlet 24 and/or along a surface of 25*s* the light outlet 25 can reducing settling of particulate matter comprised in the sensing stream 5 on the respective surface. Reduction of contamination may increase intervals between maintenance and/or cleaning procedures. Inventors found that by providing a gas flow along the surface of the light inlet 24 and/or light outlet 25 may mitigate settling of particles on said surfaces and/or flush off particulate matter already settled on said surfaces. To this end the optical flow cell 20 may be provided with an purge inlet, e.g. as shown, arranged to provide a purge flow $P_F$ along one or more of a light inlet surface 24*s* and light outlet surface 25*s*. Advantageously a provided purge flow $P_F$ may exits the optical flow cell 20 along with the sensing stream 5 though the flow cell outlet 23. In some embodiments, the optical flow cell 20 may be arranged to provide said purge flow incidentally, e.g. at regular intervals or upon operator instruction. In some embodiments, the optical flow cell 20 may be arranged to provide said purge flow while driving a sensing stream 5 through the optical flow cell 20. To these ends the purge inlet may be provided with one or more of the flow control means as described earlier, e.g. a pump 51 and/or or a valve 71.

In an even more preferred embodiment, the device is further arranged for determining a particulate matter 1 concentration. The device may be provided with a separate particulate matter counter and/or concentration sensor, e.g. known mass-based or volumetric concentration-based type sensing devices as described in US20180217044 or in the publication by Fung-Yu Kuo et al in Micromachines August 2018, volume 9, issue 8, 398. A reported particle count and a known or determined flow rate may be used to determine the particle concentration Said particle counter and/or concentration sensor may be provided at an upstream position of concentrator inlet 11, preferably at a downstream position of second concentrator outlet 13, e.g. along connection member 15 or at downstream of cell outlet 23. Providing the particle counter at a downstream position of second concentrator outlet may allow correlating an identified particle composition, e.g. a chemical composition, to a concentration.

Preferably, the device may be arranged for determining a particulate matter 1 concentration from a detected absorbance at one or more particle specific wavelength. As light travelling along the optical path $P_L$ at least in part follows a trajectory along the gas flow path $P_G$ interactions between light and the particulate matter 1 comprised in the sensing stream results in a particle dependent absorbance at one of more wavelengths of the light. Accordingly the absorbance (intensity) of light received at a given frequency by a photodetector depends on the concentration of particles and/or composition of the particles. Using calibration data an extinction coefficient at a given wavelength may be determined for a specific type or class of particles. Using this calibration data an unknown particle concentration may be reconstructed (calculated) from a recorded absorbance. To this end the device 100 preferably comprises or is used in an assembly comprising a sensing means including a computing system arranged to determine a particle concentration based on a pre-determined calibration parameter and a recorded absorption spectrum.

Figures 6A, 6B:
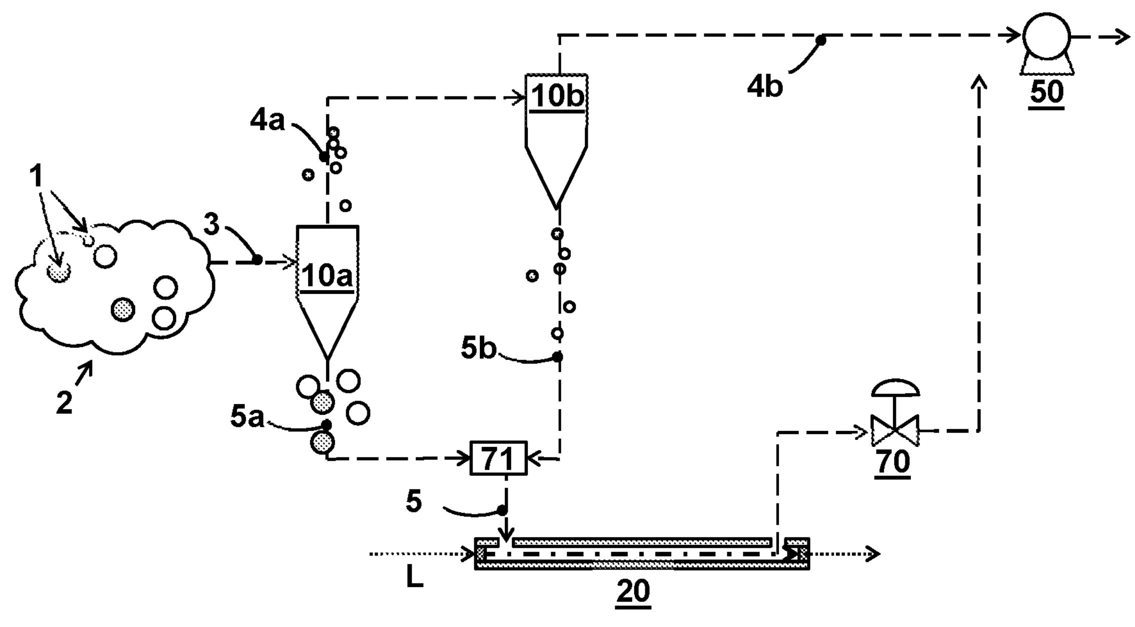
FIGS. 6A and B provide schematic cross section side views of devices arranged for identifying a chemical composition of particulate matter in an aerosol in dependence of a size distribution.

In some preferred embodiments, e.g. as shown in FIGS. 6A and 6B the device is arranged for identifying a chemical composition of particulate matter 1 in an aerosol 2 in dependence of a size distribution. As described earlier the separating properties of an impactor, particularly a cyclone, may be adjusted by adjusting an input flow rate and/or flow rate distribution between first and second impactor outlets 12, 13. The amount and size range of particles which are diverted to the sensing stream 5 may advantageously be adjusted by adjusting a flow rate of the received aerosol stream 3, e.g. by controlling a pumping rate or setting of a mass flow controller. As described earlier the input flow rate and/or flow rate distribution between first and second impactor outlets of the first and second impactor may be suitably controlled by a number of means including pumps 50 and mass flow controllers 70. Accordingly, in a one embodiment the device may be arranged to identify a chemical composition of particulate matter 1 in an aerosol 2 in dependence of particle size. To this end the device may comprise an array of impactors 10*a*, 10*b*, e.g. as shown in FIGS. 6A and B. In such array a flow distribution and/or flow speed at a first impactor 10*a* may selected such that the sensing stream 5*a* output of the first impactor comprises particles in a first (comparatively large diameter) size fraction of the particulate matter 1 in the aerosol 2. The outlet stream 4*a* of the first impactor comprising particles a second (comparatively small diameter) size fraction is sent to a consecutive impactor 10*b* set to divert the smaller particles to its respective sensing stream 5*b*. These sensing streams 5*a*, 5*b* are analyzed in an optical flow cell 20. In some embodiments, the respective sensing streams 5*a* and 5*b* may be analyzed by respective optical flow cells 20*a* and 20*b*, e.g. as shown in FIG. 6B. Alternatively, the system may be provided with a flow selector 71 (e.g. a valve) to alternatingly direct a respective sensing stream 5*a*, 5*b* to a single optical flow cell 20. By adjusting the number and the size of particles in the sensing stream 5 an absorbance, e.g. an absorption spectrum, may be obtained in dependence of the size of the particles in the sensing stream. In either case the system is arranged for combined size separation and identification, i.e. in-line size selective particle identification.

Aspects of the present disclosure can also be embodied as a method for in-line identification of a chemical composition of particulate matter comprised in an aerosol. For example, some embodiments comprise receiving an aerosol stream 3 of the aerosol 2 at an impactor inlet 11 of an impactor 10. Other or further embodiments comprise diverting the aerosol stream 3 to an outlet stream 4 at a first impactor outlet 12 of the impactor 10, and a sensing stream 5 at a second impactor outlet 13 of the impactor 10. Preferably, the impactor 10 provides the outlet stream 4 with a decreased particulate matter concentration compared to an initial particulate matter concentration of the received aerosol stream 3, and the sensing stream 5 with an increased particulate matter concentration compared to the initial particulate matter concentration.

Some embodiments comprise directing the sensing stream 5 via a fluid connection from the second impactor outlet 13 into a flow cell inlet 21 of an optical flow cell 20. Preferably, the sensing stream 5 is guided via an elongate hollow wave guide 22 of the optical flow cell 20 to a flow cell outlet 23 of the optical flow cell 20. Other or further embodiments comprise directing a beam of light L into a light inlet 24 of the optical flow cell 20. For example, the light L travels through the elongate hollow wave guide 22 to a light outlet 25 of the optical flow cell 20. Accordingly the optical flow cell 20 forms both a gas flow path $P_G$ for the sensing stream 5 along the elongate hollow wave guide 22 between the flow cell inlet 21 and flow cell outlet 23, and an optical path $P_L$ for the light L along the elongate hollow wave guide 22 between the light inlet 24 and the light outlet 25. Preferably, the gas flow path $P_G$ and the optical path $P_L$ at least in part follow a common trajectory $P_C$.

One embodiment comprises identifying the chemical composition of the particulate matter based on an absorption at one or more wavelengths of the light by the increased particulate matter concentration in the sensing stream 5 in the common trajectory Pc of the elongate hollow wave guide 22. Preferably, the increased particulate matter concentration of the sensing stream 5 and a length of the common trajectory $P_C$ are configured to provide an absorption in a range between one and ninety-nine percent, preferably between ten and ninety percent, for one or more detected wavelengths of the light L.

As described earlier guiding the sensing stream and light along a common trajectory in an elongate hollow wave guide may advantageously increase interaction (absorbance) of the light with the particulate matter comprised in the sensing stream. As described earlier a length of the common trajectory is preferably selected to have a detectable material specific absorbance per unit length per unit concentration at one or more wavelengths of the light.

Figure 7A:
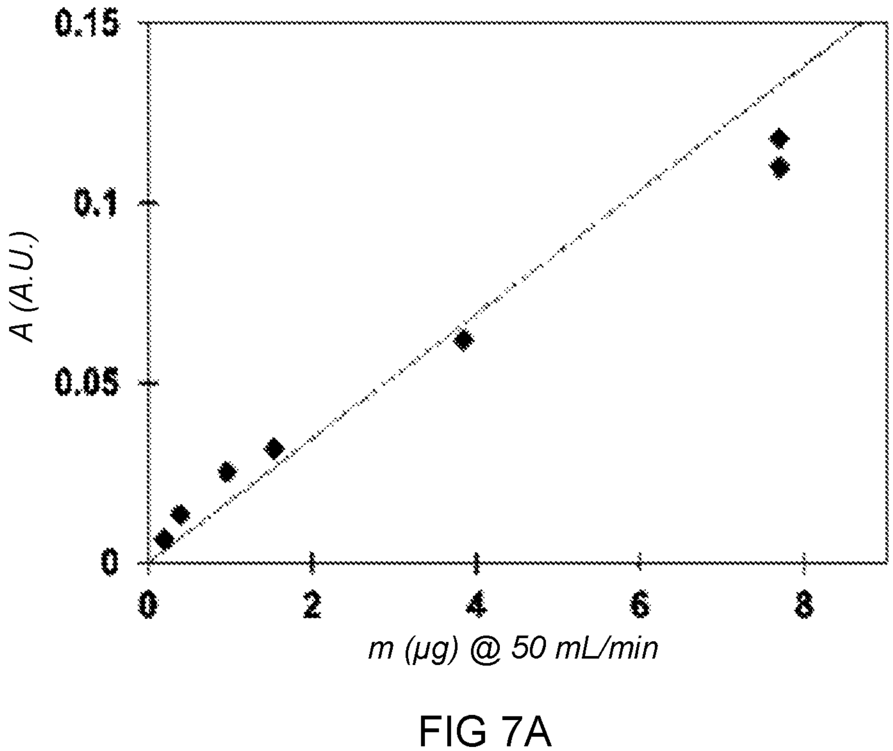
FIG. 7A depicts a plots of measured optical absorbance values of particulate matter in an aerosol in dependence of particle concentration.
Figure 7B:
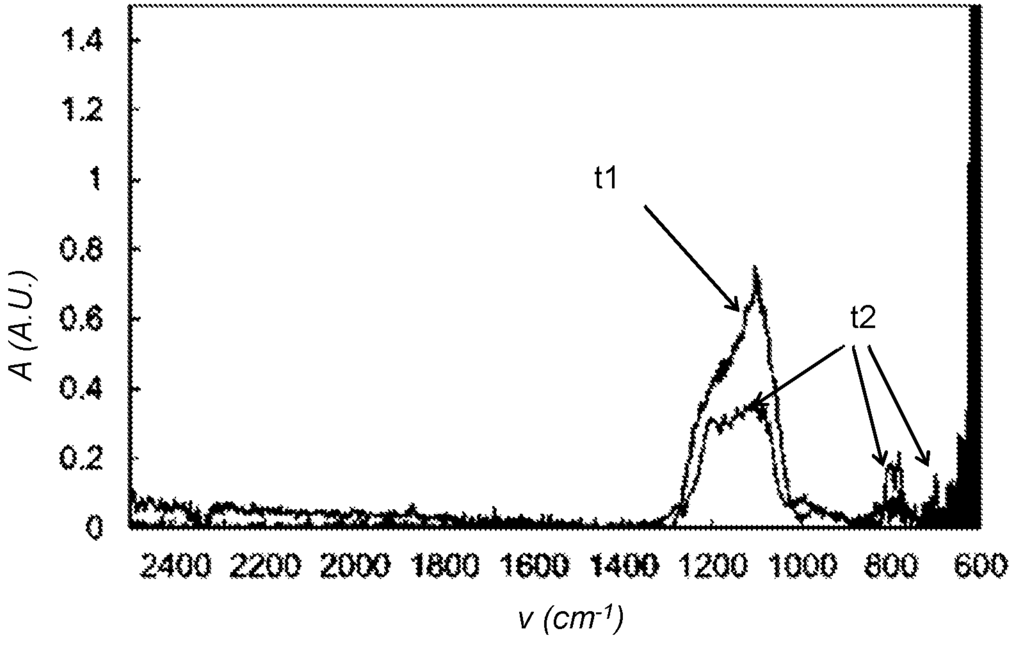
FIG. 7B depicts measured absorbance spectra of particulate matter in aerosols comprising particles of different composition.

Now with reference to FIGS. 7A and 7B there will be provided a number of illustrative non-limiting examples according to the invention. In the examples an optical flow cell having a linear metallic coated tubular elongate hollow wave guide with length 4 cm and a diameter of 1 mm was used. At a respective first end of the linear metallic coated tubular elongate hollow wave guide a first optical fiber was inserted to guide light from an IR source of a handheld FTIR device (Agilent 4300) into the waveguide. A second optical fiber inserted at an opposing end of the waveguide was used to collect the light and guide the light to the sensor of the FTIR device. Through the side walls near end portions of the hollow waveguide close to the respective fiber ends a respective gas inlet and outlet were provided. Coupled to the inlet was an aerosol stream of 50 mL/min comprising silica particles. As can be seen from FIG. 7A the mass m of silica particles in the sensing stream correlates to a measured absorbance (A in arbitrary units A.U.) at 1200 $cm^{-1}$. In a second example the elongate hollow wave guide was fed with an aerosol stream comprising a mixture of amorphous silica and (semi)-crystalline silicon particles. As can be seen from FIG. 7B a recorded absorbance spectrum can be used to distinguish, i.e. positively identify a presence of a specific particle type. The spectrum marked t1 relates to measurements on a stream with amorphous particles. The spectrum marked t2 relates to measurements on a stream with (semi) crystalline particles. As can be seen from FIG. 7B presence or absence peaks (e.g. at 700 or 800 $cm^{-1}$) can be used to distinguish a type of the particles. Further, and intensity ratio or peak shape in a region between about 1050 and 1250 $cm^{-1}$ can be used to distinguish a type of the particles.

For the purpose of clarity and a concise description, features are described herein as part of the same or separate embodiments, however, it will be appreciated that the scope of the invention may include embodiments having combinations of all or some of the features described. For example, while embodiments were shown for devices with integrated or external light sources and light detectors, also alternative ways may be envisaged by those skilled in the art having the benefit of the present disclosure for achieving a similar function and result. E.g. a device having an integrated sensor and an external light source. Further, impactors may be combined or split up into one or more alternative components. The various elements of the embodiments as discussed and shown offer certain advantages, such as the use of impactors for concentrating an aerosol and the use of an elongate hollow wave guide to improve interaction between light an particulate matter in a sensing stream Of course, it is to be appreciated that any one of the above embodiments or processes may be combined with one or more other embodiments or processes to provide even further improvements in finding and matching designs and advantages. It is appreciated that this disclosure offers particular advantages to air quality monitoring, and in general can be applied for any application benefiting from the provide ability to provide in-line particle characterization.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A device for in-line identifying a chemical composition of particulate matter in an aerosol, the device comprising:
- an impactor arranged for diverting an aerosol stream, having an initial particulate matter concentration, received at an impactor inlet to an outlet stream at a first impactor outlet and to a sensing stream at a second impactor outlet,
  - wherein separation of the particulate matter at the impactor is based on differences in inertia of various particles comprised in the aerosol, and
  - wherein the impactor is configured to provide:
    - the outlet stream with a decreased particulate matter concentration compared to the initial particulate matter concentration,
    - the sensing stream with 100 to 100,000 times increased particulate matter concentration compared to the initial particulate matter concentration, and
    - tunable particulate matter concentration; and
- an optical flow cell comprising:
  - a flow cell inlet fluidly connected to the second impactor outlet,
  - a flow cell outlet, and
  - an elongate hollow wave guide including a light inlet and a light outlet for in-coupling and out-coupling of light, respectively,
  - wherein the optical flow cell forms both a gas flow path along the elongate hollow wave guide between the flow cell inlet and flow cell outlet, and an optical path along the elongate hollow wave guide between the light inlet and the light outlet, and
  - wherein the gas flow path and the optical path at least in part follow a common trajectory in the elongate hollow wave guide of the optical flow cell to allow light travelling along said common trajectory to interact with particulate matter of the tunable particulate matter concentration comprised in the sensing stream for identification of the chemical composition of the particulate matter in the aerosol.

2. The device according to claim 1, comprising a light source and/or a light detector, wherein the light source is arranged to provide light to the light inlet, and wherein the light detector is arranged to receive light from the light outlet after interacting with particulate matter in the optical flow cell.

3. The device according to claim 1, wherein the device is arranged to control relative flow rates of the outlet stream and sensing stream.

4. The device according to claim 1, wherein the impactor is a cyclone provided with a second impactor outlet from which a sensing stream comprising separated particles can continuously leave the cyclone and be directed towards the optical flow cell.

5. The device according to claim 1, wherein one or more inner side-walls of the elongate hollow wave-guide are at least partially coated with an optically reflective coating.

6. The device according to claim 1, wherein the elongate hollow wave guide is provided between facing surfaces of at least two adjacent body members,
- wherein one or more inner side-walls of the elongate hollow wave guide are at least partially coated with an optically reflective coating, and
- wherein the optically reflective coating seals adjoining body members of the elongate hollow wave guide, thereby improving air-tightness of the elongate hollow wave guide.

7. The device according to claim 1, wherein the light inlet and the light outlet for in-coupling and out-coupling of light are formed, respectively, by a reversibly connectable end portion of an optical inlet fiber and by an optical outlet fiber ending in the optical flow cell.

8. The device according to claim 1, wherein the elongate hollow wave guide is arranged along a meandering trajectory wherein a distance between the flow cell inlet and the flow cell outlet is less than a length of the path followed by the gas, by a factor of at least two.

9. The device according to claim 1, wherein a selectively activatable valve is provided between the second impactor outlet and the flow cell inlet arranged for providing the sensing stream to the elongate hollow wave guide in a pulse type fashion to tunably increase a particle concentration at the elongate hollow wave guide.

10. The device according to claim 1, wherein the optical flow cell is arranged to provide a purge flow along a surface of the light inlet and/or along a surface of the light outlet for reducing settling of particulate matter comprised in the sensing stream on the respective surface.

11. The device according to claim 1, wherein the device is particularly arranged for measuring a flowrate of the aerosol stream, and thereby determining a particulate matter concentration in the sensing stream.

12. The device according to claim 1, comprising two or more instances of the impactor, and wherein the two or more of the impactor are arranged for identifying a chemical composition of the particulate matter in an aerosol in dependence of a size distribution, and wherein the chemical composition is identified in the sensing stream of the respective instances of the two or more instances of the impactor.

13. The device according to claim 1, wherein the impactor is a microcyclone arranged to essentially redirect particulate matter to the sensing stream using a flow rate of the received aerosol stream in a range from about 50 to 10000 mL/minute.

14. The device according to claim 1, wherein the particulate matter concentration in the sensing stream is tuned by at least one of the group consisting of:
- a structure configured to selectively adjust flow rate of one or more of the outlet stream and the sensing stream; and
- a selectively activatable valve for providing the sensing stream to the elongate hollow wave guide in a pulse type fashion.

15. The device according to claim 1, wherein the impactor is configured to effect separation exclusively by inertial impaction generated by geometry and flow conditions of the impactor.

16. The device according to claim 1, wherein the impactor is configured to separate particles exclusively by inertial impaction and to establish a separation threshold based on particle inertia, the separation threshold directing to the sensing stream only particles having a largest dimension of one fifth or less of an inner diameter of the elongate hollow wave guide, and directing particles having a larger dimension to the outlet stream, the inner diameter being at least five times the largest particle dimension admitted to the hollow wave guide.

17. The device of claim 1, wherein the gas flow path within the elongate hollow wave guide is confined and unbranched along an entire common trajectory between the flow cell inlet and the flow cell outlet and between the light inlet and the light outlet, wherein the increased particulate matter concentration in the sensing stream is maintained along the entire common trajectory within the elongate hollow wave guide.

18. The device according to claim 1, wherein the sensing stream has a particulate matter concentration that is 1000 to 100000 times larger than the initial particulate matter concentration.

19. A method for in-line identifying a chemical composition of particulate matter in an aerosol, the method comprising:

receiving an aerosol stream of the aerosol, having an initial particulate matter concentration, at an impactor inlet of an impactor;

diverting the aerosol stream to an outlet stream at a first impactor outlet of the impactor and to a sensing stream at a second impactor outlet of the impactor, wherein the impactor provides:

the outlet stream with a decreased particulate matter concentration compared to the initial particulate matter concentration, and the sensing stream with 100 to 100,000 time increased particulate matter concentration compared to the initial particulate matter concentration, and tunable particulate matter concentration; and wherein separation of the particulate matter at the impactor is based on differences in inertia of various particles comprised in the aerosol;

directing the sensing stream via a fluid connection from the second impactor outlet into a flow cell inlet of an optical flow cell, wherein the sensing stream is guided via an elongate hollow wave guide of the optical flow cell to a flow cell outlet of the optical flow cell;

directing a beam of light into a light inlet of the optical flow cell, wherein light of the beam of light travels through the elongate hollow wave guide to a light outlet of the optical flow cell, wherein the optical flow cell forms both a gas flow path for the sensing stream along the elongate hollow wave guide between the flow cell inlet and flow cell outlet, and an optical path for the light along the elongate hollow wave guide between the light inlet and the light outlet, and wherein the gas flow path and the optical path at least in part follow a common trajectory in the elongate hollow wave guide of the optical flow cell to allow light travelling along the common trajectory to interact with particulate matter of the tunable particulate matter concentration comprised in the sensing stream for identification of the chemical composition of the particulate matter in the aerosol; and identifying the chemical composition of the particulate matter based on an absorption at one or more wavelengths of the light by the increased particulate matter concentration in the sensing stream in the common trajectory of the elongate hollow wave guide.

20. The method according to claim 19, wherein the increased particulate matter concentration of the sensing stream and a length of the common trajectory are configured to provide an absorption in a range between ten and ninety percent for one or more detected wavelengths of light of the beam of light.

21. The method according to claim 19, wherein the particulate matter concentration in the sensing stream is tuned by at least one of the group consisting of:

a structure configured to selectively adjust flow rate of one or more of the outlet stream and the sensing stream; and a selectively activatable valve for providing the sensing stream to the elongate hollow wave guide in a pulse type fashion.

22. The method of claim 19, wherein the elongate hollow wave guide has an inner diameter that is at least five times greater than a largest particle dimension admitted to the hollow wave guide from the impactor.

* * * * *